March 24, 1964 H. J. WOLLNER 3,125,883
CORING TOOL
Filed March 1, 1961
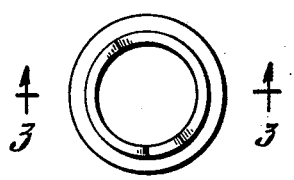
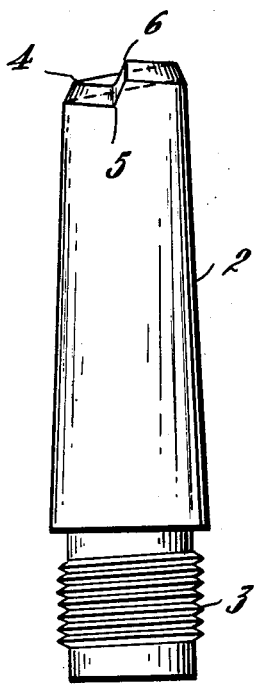
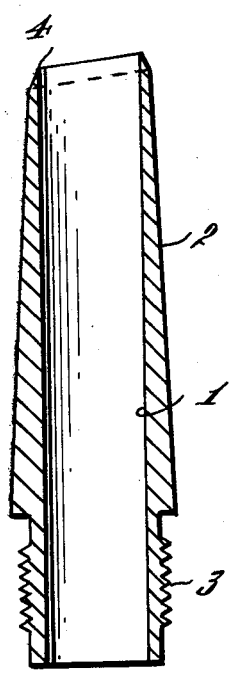
INVENTOR.
Herbert J. Wollner
BY
Roberts, Cushman & Grover
ATT'YS

United States Patent Office 3,125,883
Patented Mar. 24, 1964

3,125,883
CORING TOOL
Herbert J. Wollner, Belmont, Mass., assignor to ACH Fiber Service, Inc., Boston, Mass., a corporation of Massachusetts
Filed Mar. 1, 1961, Ser. No. 92,486
2 Claims. (Cl. 73—425)

This invention relates to a tool for extracting samples of wool or other fibrous material from bags or bales or other batches of fibrous material, and has for its objects to provide a tool which penetrates easily and rapidly, which does not disturb the composition of the material at the location where the sample is extracted so that the extracted sample accurately represents the composition of the material, which is simple and economical in construction and which can be sharpened easily.

According to the present invention the tool comprises a tubular cutter having a cutting edge and means for attaching it to a rotor, characterized in that the cutting edge has a helical shape which progresses forwardly in the direction opposite to the direction of rotation. Preferably the aforesaid helix extends around the tool throughout approximately 360°. In the preferred embodiment the cutting edge is located at the inner periphery of the tubular cutter and the forward end of the tool slopes rearwardly from the inner periphery to the outer periphery.

For the purpose of illustration a typical embodiment of the invention is shown in the accompanying drawing in which FIG. 1 is a view of the forward end of the tool;
FIG. 2 is a side view; and
FIG. 3 is a section on line 3—3 of FIG. 1.

The particular embodiment of the invention chosen for the purpose of illustration comprises a tubular tool having a cylindrical inner periphery 1 and a conical outer periphery 2. However both peripheries may be cylindrical or the outer periphery cylindrical and the inner periphery flaring from front to rear. At its rear end the tool has a threaded portion 3 for mounting it in a portable drill or other rotor.

According to the present invention the cutting edge 4 is located at the inner periphery of the tool and has a helical shape, the helix extending from the rear end 5 of an abrupt or generally axial shoulder to the forward end 6 of the shoulder. Thus with the spiral progressing forwardly in a clockwise direction (FIG. 1), the tool should be rotated in a counterclockwise direction.

With the cutting edge shaped as herein described and claimed the tool makes a clean cut rapidly and with little pushing effort. The tool may be sharpened easily and quickly by a grinding machine such as described and claimed in my co-pending application Ser. No. 92,487, filed on even date herewith.

It should be understood that the present disclosure is for the purpose of illustration only and that this invention includes all modifications and equivalents which fall within the scope of the appended claims.

I claim:
1. A coring tool for sampling batches of fibrous material and the like comprising a tubular cutter having a helical cutting edge and means for attaching it to a rotor, characterized in that said cutting edge has a helical shape which progresses forwardly in the direction opposite to the direction of rotation from a low point to a high point, the edge having a generally axial shoulder facing in said direction at said low point and the helix progressing continuously throughout its length.
2. A coring tool according to claim 1 further characterized in that the helix extends around the tool throughout approximately 360°.

References Cited in the file of this patent
UNITED STATES PATENTS

| | | |
|---|---|---|
| 623,506 | Baker | Apr. 25, 1899 |
| 774,933 | Cachelin | Nov. 15, 1904 |
| 854,570 | Downie | May 21, 1907 |
| 2,606,615 | Pevey et al. | Aug. 12, 1952 |